Aug. 24, 1937.　　　S. E. THORNTON　　　2,090,879
FLOOR BOARD PLANER HEAD
Filed Aug. 6, 1936
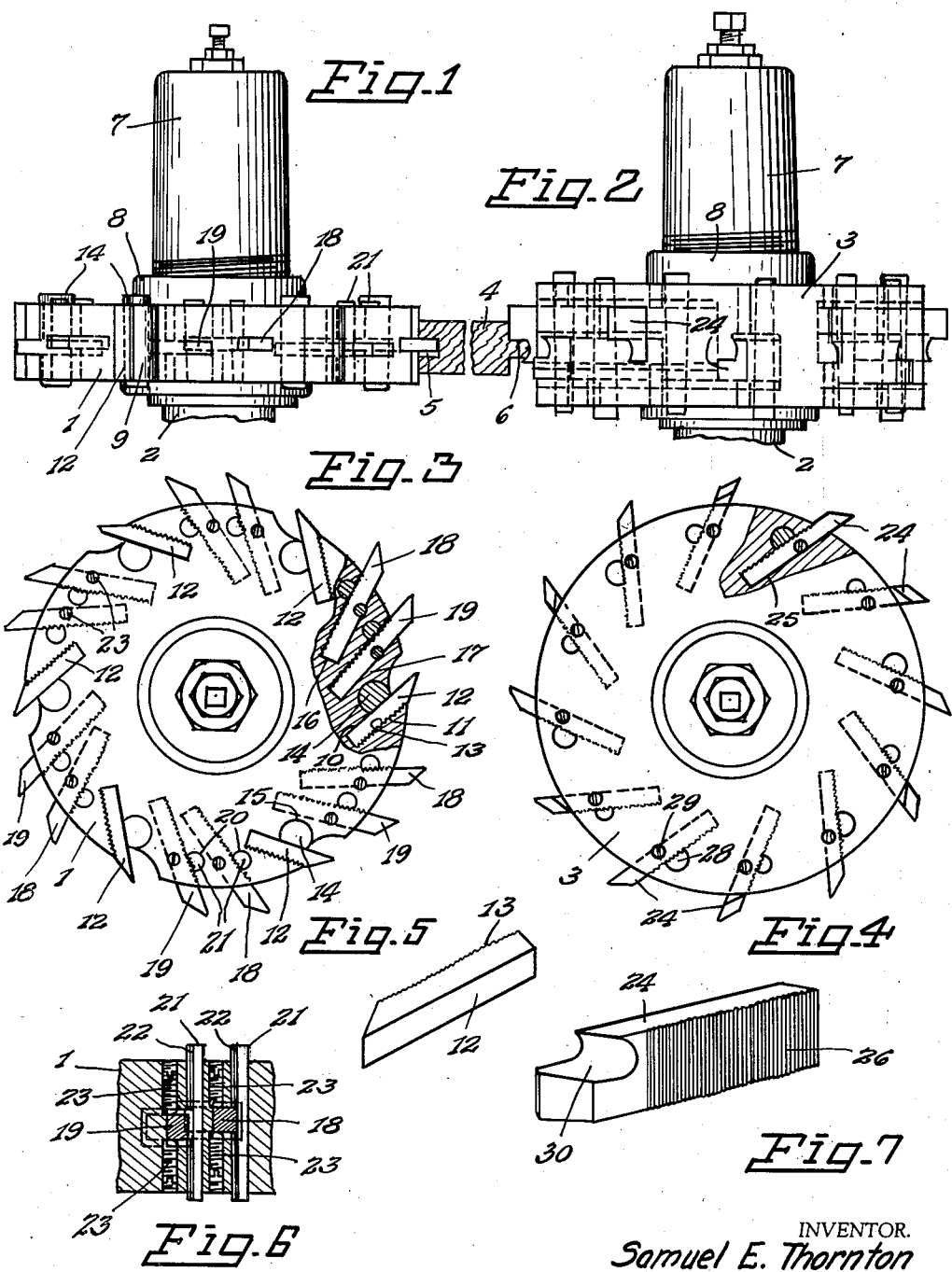
INVENTOR.
Samuel E. Thornton
BY
ATTORNEY.

Patented Aug. 24, 1937

2,090,879

UNITED STATES PATENT OFFICE 2,090,879

FLOOR BOARD PLANER HEAD

Samuel E. Thornton, Coeur d'Alene, Idaho

Application August 6, 1936, Serial No. 94,669

1 Claim. (Cl. 144—218)

This invention relates to an improved planer head and one object of the invention is to provide a planer head by means of which flooring boards may be cut to provide a groove in one side edge face of a board and a tongue along the other side edge face of the board.

Another object of the invention is to so form the head that cutting blades of an improved construction may be set in place in sockets formed therein and firmly but detachably secured with sharpened end portions of the blades projecting from the peripheral face of the head at such an angle that the floor boards will be accurately and smoothly cut as they pass between a pair of planer heads.

Another object of the invention is to so mount the cutters that certain of them will be transversely offset relative to the remaining cutters and thus cause each cutter to cut a groove for only a portion of its width. By thus arranging the cutters, the groove of the desired width will be formed in a step by step cutting operation and likelihood of splitting the board or forming a rough surface will be eliminated.

Another object of the invention is to so secure the cutters in the planer head that they may be shifted to positions in which they project a predetermined distance from the peripheral face of the head and then firmly secured so that they will not slip back into the planer head during a cutting operation. By this arrangement a floor board may be formed with a tongue and groove of the desired depth.

The invention is illustrated in the accompanying drawing, wherein

Figure 1 is a side elevation of a planer head of the improved construction carrying cutters for forming a groove in a floor board.

Figure 2 is a similar view of a planer head carrying cutters for forming a tongue along a floor board.

Figure 3 is a top plan view of Figure 1.

Figure 4 is a top plan view of Figure 2.

Figure 5 is a perspective view of one of the cutters of the planer head shown in Figures 1 and 3.

Figure 6 is a fragmentary sectional view illustrating the manner in which the cutters are detachably secured in the planer head.

Figure 7 is a perspective view of one of the cutters of the planer head shown in Figures 2 and 4.

The planer head 1 is formed from a thick circular disc or block of strong metal and is mounted upon a rotary shaft 2 which is disposed vertically and rotated in any desired manner. A planer has two of the shafts 2 and the head 1 is mounted upon one shaft while a second head or block 3 is mounted upon the other shaft in transverse spaced relation to the head 1, as shown in Figures 1 and 2, so that a board 4 of the usual width used for floor boards may be fed between the heads and one side edge face of the board formed with a groove 5, while the other side edge portion of the board is cut to form a tongue 6. The blocks or heads fit about the necks 7 of the two shafts 1 and 2 where they are secured by the threaded rings 8.

The peripheral edge face of the block or head 1 is formed with circumferentially spaced clearance notches 9 from which extend sockets 10 having ribbed or serrated walls 11 so that when the cutters 12 are inserted and secured, the teeth 13 formed upon one side face of each cutter may be interengaged with the ribs of the walls of the socket into which the cutter fits and the cutter be prevented from slipping longitudinally out of place. The cutters 12 extend the full width of the edge face of the head 1 and serve to trim the side edge face of the floor board. Pins 14 pass through openings or passages 15 formed through the head at the opposite side of each socket 10 from the serrated wall 11 thereof and open into the notches 9 so that when the pins are removed, the cutters 12 may be easily slid into the sockets. The pins may then be passed through the openings and as they are tapered towards their lower ends, as shown in Figure 1, the cutters will be shifted transversely and their teeth moved into interlocking engagement with the ribs or teeth of the confronting walls of the sockets.

Between the notches 9, the block or head is formed with other sockets 16 and 17 which converge inwardly, as shown in Figure 3, and are to receive the cutters 18 and 19 which are of greater length than the cutters 12 and project from the peripheral edge face of the block a greater distance. By this arrangement, the cutters 18 and 19 may form a groove in the board while the cutters 12 are trimming the edge face of the board at opposite sides of the groove. Openings or passages 20 are formed through the block at sides of the sockets 16 and 17 to receive the pins 21 and it should be noted that these pins are formed with longitudinally extending ribs 22 which have interlocking engagement with ribs formed upon the cutters so that the cutters will be held against slipping out of place. There have also been provided set screws 23 which are screwed through threaded openings formed in the block from opposite side faces and engage opposite side faces of the cutters, as shown in Figure 6. Therefore, the cutters 18 and 19 will be very securely held in place but may be easily removed or adjusted when necessary. Each pair of cutters 18 and 19 cooperate with each other to form a groove of the desired width, and by referring to Figures 1 and 6 it will be seen that the companion cutters are offset transversely of each other so that while they overlap each projects transversely beyond the other. By this arrangement, each cutter cuts a portion of a groove of less width than the groove and a groove of the desired depth and width may be formed without likelihood of splitting the board and also the walls of the groove will be smooth so that the rib of an adjoining floor board may be easily engaged in the groove.

The rib 6 is formed by cutters 24 carried by the block or head 2 and each of these cutters fits into a socket 25 formed in the head. These cutters are formed with ribs along one side face, as shown at 26 in Figure 7, and are secured in the sockets by pins 28 corresponding to the pins 21 and set screws 29 corresponding to the set screws 23. Upon referring to Figure 7 it will be seen that each cutter 24 is formed at its outer end with a recess 30 of approximately one-half the width of the cutter. Therefore, when a board is engaged by the cutter it will cut the board to form one-half of the rib and trim the edge face of the board at this side of the rib. Alternate cutters have their recesses facing in opposite directions, as shown in Figure 2, and the cutters are offset as shown in this figure. Therefore as a board is fed between the two heads 1 and 2, the cutters will form a complete rib of the desired width and thickness and edge faces of the board at opposite sides of the rib will be trimmed. The fact that the cutters do not straddle the rib and each only cuts one-half of a rib prevents the portion of the board forming the rib from being compressed transversely and thus prevented from having a tight fit into the groove of an adjoining floor board.

From the above description it will be seen that when the companion heads or blocks are mounted upon the shafts of a planer and the shafts and heads set in motion, a board may be fed between the rotating heads and as it moves longitudinally between the heads, the cutters of the two heads will cause a groove to be formed along one side edge face of the board and a rib along the other side edge face of the board.

Having thus described the invention, what is claimed as new is:

A floor board planer comprising a block adapted to be mounted upon a vertically disposed rotary shaft, said block being formed with sockets opening through its peripheral edge face intermediate the thickness of the block and each extending diagonally of a radius of the block, a passage being formed through the block parallel to the axis thereof at one side of each socket and along one side opening into the socket, cutters fitting loosely in said sockets and having portions projecting outwardly therefrom at a tangent to the peripheral edge face of the block, the cutters being sharpened at their outer ends, pins passing through said passages and having flat faces bearing against side faces of the cutters, the contacting faces of the pins and cutters being formed with interengaging ribs extending transversely of the cutters and holding the cutters against longitudinal movement, and set screws carried by said cutters and securing the cutters in adjusted positions transversely of the peripheral edge of the block whereby alternate cutters may be shifted transversely of the peripheral face of the block in opposite directions and cooperate with each other to cut a groove of predetermined width when the planer is in use.

SAMUEL E. THORNTON.